United States Patent Office 3,399,050
Patented Aug. 27, 1968

3,399,050
PRODUCTION OF NICKEL POWDER
David J. I. Evans, Edmonton, Alberta, and Wasyl Kunda, Herbert Arthur Hancock, and Vladimir Nicolaus Mackiw, Fort Saskatchewan, Alberta, Canada, assignors to Sherritt Gordon Mines Limited, Toronto, Ontario, Canada, a company of Canada
Filed Feb. 23, 1965, Ser. No. 434,428
19 Claims. (Cl. 75—.5)

ABSTRACT OF THE DISCLOSURE

A process for producing nickel powder having a predetermined apparent density between 0.4 and 3.5 gm./cm.$^3$ in which a slurry of basic nickel carbonate in aqueous ammonium carbonate solution is reacted with hydrogen at elevated temperature and pressure to effect direct reduction of the basic nickel carbonate to elemental nickel powder. Apparent density is controlled by controlling and correlating the $NH_3/Ni$ molar ratio and $CO_2/Ni$ molar ratio within certain specific ranges. The low apparent density powder product consists of particles in the form of grape-like clusters formed of numerous small sub-particles agglomerated together.

---

This invention is concerned with the precipitation of nickle from aqueous media by the reducing action of hydrogen gas. More particularly, it is concerned with improvements in such processes whereby elemental nickel powder of high purity and predetermined physical properties such as apparent density and particle size is produced by hydrogen reduction from an aqueous ammoniacal nickel ammonium carbonate system at elevated temperature and pressure.

Processes are known by which nickel can be precipitated in the form of finely divided elemental metal particles of random shape and size within the range of from about sub-micron to about 300 microns from a solution in which it is present as a salt by reacting the solution with a sulphur-free reducing gas at elevated temperature and pressure. United States Patent No. 2,734,821 issued Feb. 14, 1956, describes, in detail, the application of this method to the production of nickel and other metals between silver and cadmium in the electromotive force series from acidic, neutral and basic solutions. The reduction of nickel is dealt with generally in columns 15 through 21 of the patent.

Nickel particles of random size and shape produced in accordance with this general method have many uses and, in particular, are ideally adapted for compacting purposes. However, more recently, there has been an increasing demand in industry for nickel powders with physical and chemical properties tailored to meet the specific requirements of various specialized applications. One such application which is becoming increasingly important is the fabrication of porous, sintered membranes or matrices such as are used for electrodes in nickel cadmium batteries and fuel cells.

These porous metal membranes are commonly fabricated by gravity sintering metal powders in a reducing atmosphere to form a coherent body having a pore volume of at least 50% of the total volume and preferably above 80%. It is known to obtain the necessary porosity by mixing the powder with a resin or plastic type material which acts as a spacing agent and which is subsequently volatilized during the sintering step. This procedure has the disadvantage that uniformity of pore size and spacing is difficult to control and, in addition, gases escaping during the volatilization of the spacing agent tend to cause distortion of the sinter-body.

In order to avoid these problems, it is desirable to fabricate such porous membranes from high purity nickel powder having physical characteristics which produce high pore volume directly upon sintering without the need for organic spacing agents. Prior to the present invention, the only such powders that were readily available were produced by the decomposition of nickel carbonyl under specially controlled conditions which promote the formation of low apparent density powder. Nickel powders produced by hydrometallurgical methods involving hydrogen reduction of ammoniacal nickel ammonium sulphate solutions in accordance with the broad teachings of the above noted United States patent have been available commercially for a number of years. However, the number of powder metallurgical applications for these nickel powders has been limited, primarily because of the limitations in apparent density and particle shape inherent in the process.

It is a principal object of this invention to provide a novel hydrometallurgical method for producing high purity nickel powder having controlled physical properties.

A further object of this invention is to provide a process which permits the economic and efficient production of elemental nickel powder characterized by controlled apparent density and particle size, irregular shape and high chemical purity. (The term "apparent density" as used throughout the description and claims herein means the weight of a unit volume of metal powder as determined by the Metals Powder Association standard method 9–50T.)

Another object of the invention is to provide a process which permits the economic production of nickel powder having physical and chemical properties which render it ideal for use in the fabrication of high porosity sinterbodies such as alkaline battery plates.

Still another object of this invention is to provide a process wherein elemental nickel powder having an apparent density of 1.3 grams per cubic centimeter is produced by treating an aqueous ammoniated nickel carbonate system of controlled composition with respect to nickel, ammonia and carbon dioxide contents with hydrogen at elevated temperature and pressure.

A further object of the invention is to provide a nickel powder of high purity and low apparent density which produces strong, high porosity sinter-bodies while exhibiting low shrinkage characteristics.

The present invention is based on the discovery that the physical characteristics of nickel powder precipitated by hydrogen reduction from a system comprised of a suspension of basic nickel carbonates in aqueous ammonium carbonate solution can be controlled by controlling the operating conditions and system composition. We have found that apparent density of nickel reduced from this system is largely dependent on the ammonia and carbon dioxide concentrations, and particle size, as determined in a Fisher sub-sieve sizer, is dependent mainly on the nickel concentration, the temperature and the hydrogen partial pressure. As a result, by controlling reduction conditions and the carbon dioxide to nickel and ammonia to nickel molar ratios within certain specific limits, nickel powders to meet any required specifications can be prepared. Among the advantageous characteristics of the nickel powders produced from the carbonate system in accordance with this invention are their high purity and controlled apparent density. This latter characteristic makes it possible to tailor-make nickel powders particularly suitable for the preparation of sintered plaques with high porosity or accurately controlled permeability.

In its broadest aspects, the present invention contemplates a method for producing high purity nickel powder of controlled physical properties which includes the steps of forming a suspension of basic nickel carbonate in aqueous ammonium carbonate solution which contains up to about 150 grams per litre of nickel, up to about 1.5 moles of carbon dioxide for each mole of nickel, and up to about 8.0 moles of ammonia per mole of nickel; adjusting and correlating the carbon dioxide to nickel and ammonia to nickel molar ratios within the limits described in detail hereinbelow, such that during reduction nickel powder of the desired physical properties is precipitated from the system; and reacting the so adjusted system with hydrogen at elevated temperature and pressure to precipitate nickel particles of the desired properties. (All references to ammonia and carbon dioxide in the present description and claims means, unless otherwise specified, both "free," i.e. uncombined ammonia and carbon dioxide and that bound in the various compounds present in the system.)

Nickel powders obtained in accordance with the present invention are of high purity, usually at least 99.9% nickel and exhibit the following range of properties: Apparent density—0.5 to 3.6 gm./cc., Fisher number 1 to 10, specific surface area, by the B.E.T. method using a Perkin Elmer sorptometer, 0.5 to 3.5 m.²/gm.

The low apparent density powders, i.e. powders having an apparent density below about 1.3 gm./cc. produced in accordance with this invention are of high purity and possess novel physical characteristics which render them ideal for use in the fabrication of porous sintered plaques. These low density powders consist of relatively uniformly sized particles ranging in size (actual size) from about 10 to about 150 microns. The particles are in the form of grape-like clusters apparently formed of large numbers of smaller particles less than about 5 microns in size adhered or agglomerated together and in a preferred form have a specific surface area of 0.5 to about 1.1 m.²/gm. and a Fisher number of 2.0 to 5.0.

The invention is described in detail hereinafter with reference to the accompanying drawings in which.

There are two basic operations in carrying the present invention into practice: firstly, the preparation of and adjustment of the composition of the reduction feed system; secondly, the reaction of the adjusted feed system with hydrogen to precipitate elemental nickel particles of the desired properties.

Figure 3:
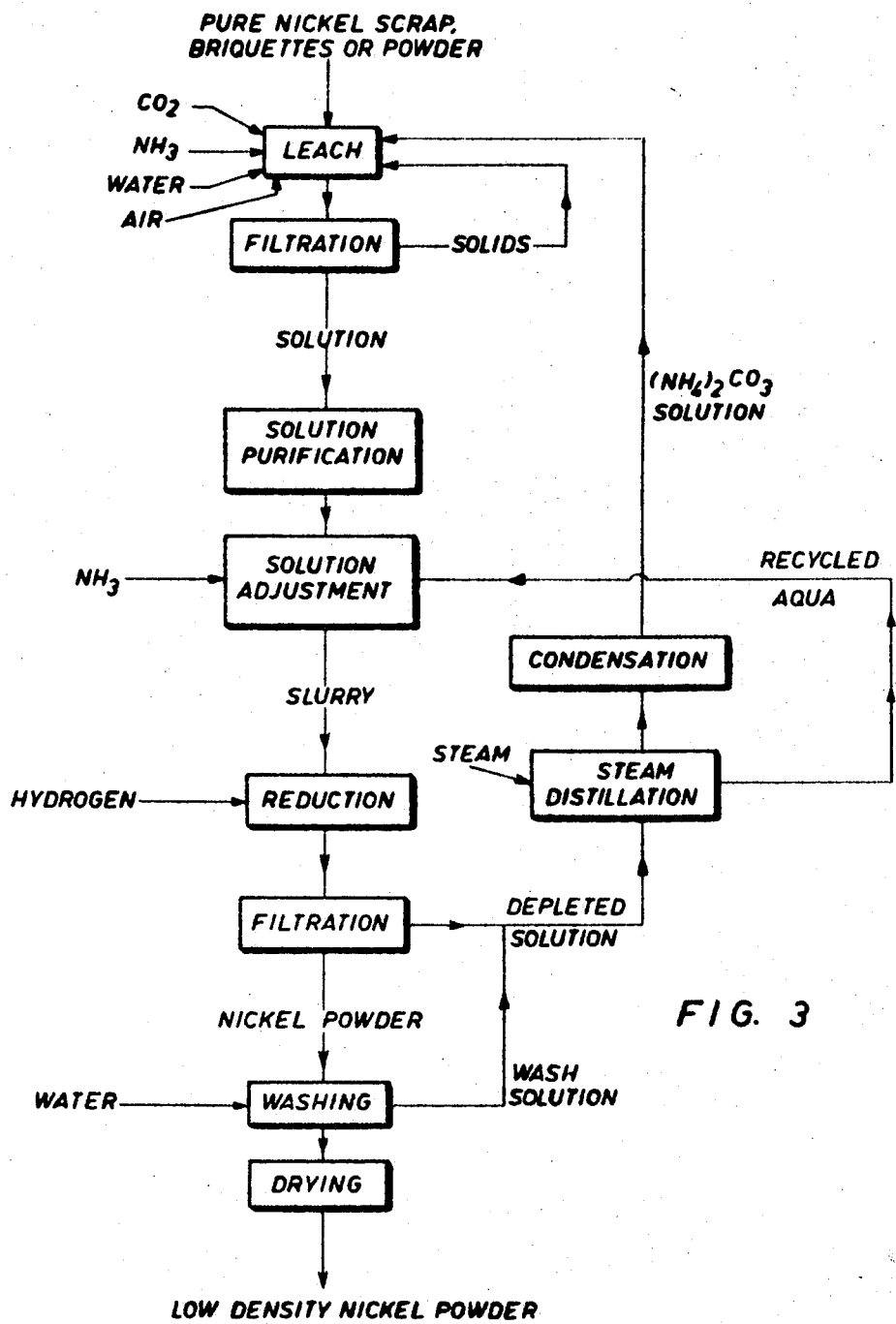
FIGURE 3 is a flow sheet illustrating an overall nickel powder production process embodying the present invention.

The reduction feed system can be prepared by any conventional or unconventional procedure which will yield a slurry of basic nickel carbonate in aqueous ammonium carbonate solution. A convenient procedure, which forms part of the overall process illustrated by the flow sheet of FIGURE 3, is to leach nickel powder or scrap in an aqueous ammonium carbonate solution in the presence of oxygen. Nickel powder is the preferred nickel source material as it dissolves readily under oxygen pressures above about 5 p.s.i. and temperatures in the 50° to 65° C. range.

The rate of dissolution is a function of the oxygen pressure, temperature and the surface area of the nickel powder used. There is generally little difficulty in dissolving up to about 180 grams per litre (g.p.l.) of nickel in the leach solution. A typical leach solution will contain 170 g.p.l. nickel, 150 g.p.l. carbon dioxide and 160 g.p.l. ammonia. The solution containing dissolved nickel is separated from the undissolved residue, generally undissolved nickel, such as by filtration and, if necessary, passed to suitable solution purification steps where undesirable impurities may be removed by known solution purification procedures. Solution purification is, of course, unnecessary where pure nickel powder is the source of nickel.

In the reduction feed adjustment operation, the nickel, carbon dioxide, and ammonia concentrations are adjusted and correlated to within the limits required for precipitation of nickel powder of the desired properties in the reduction step. Generally speaking, the instant invention contemplates the adjustment of the nickel within the broad range of about 30 to 150 g.p.l. and preferably to within the range of from about 40 grams per litre to about 80 grams per litre. The 40 to 80 grams per litre range of nickel concentration is not critical and the process will operate with lower or higher nickel concentrations, but at nickel concentrations below about 40 grams per litre, the solution volume treated per unit of nickel powder recovered becomes excessive and the operation of the process less economic. At nickel concentrations above 80 grams per litre, the vapour pressure of the solution in the subsequent reduction step becomes excessive necessitating higher operating pressures and, consequently, more expensive equipment.

Broadly, the carbon dioxide content of the system is adjusted to between about 0.4 to about 1.5 moles of carbon dioxide for each mole of nickel present and the ammonia content is adjusted to between about 0.05 and about 8.0 moles per mole of nickel present. The process may be operable under conditions of solution composition outside these broad ranges. However, these are the operable ranges from a practical point of view since at $CO_2/Ni$ molar ratios above 1.5 and/or $NH_3/Ni$ molar ratios above about 8.0, the vapour pressure of the system under the conditions of the reduction step becomes excessive and presents increased operating difficulties without any compensating benefits. The lower $CO_2/Ni$ limit of 0.4 represents the minimum $CO_2$ content of the basic nickel carbonate present in the reduction feed slurries prepared in accordance with the present invention. The lower $NH_3/Ni$ limit of .05 represents the practical minimum which can be obtained in the reduction systems employed in this invention.

In the case of reduction feed derived from leaching nickel powder or scrap in the manner discussed hereinabove, adjustment is effected by dilution with water and/or aqua ammonia and heating to remove excess carbon dioxide and/or ammonia. The heat and dilution promote the precipitation of basic nickel carbonates; thus the adjusted system will consist of a slurry of basic nickel carbonates in ammonium carbonate solution.

The heating to adjust the feed and precipitate basic nickel carbonates may be effected by atmospheric boiling, preferably by direct steam injection; or by heating the leach solution to about 185° C. or higher in the autoclave, with or without the presence of a small quantity of nickel powder "seed," and venting the autoclave to release excess carbon dioxide and ammonia.

The manner in which the adjustment heating is conducted is not, in itself, critical but it has been found that the properties of the basic nickel carbonate precipitate will vary depending on the particular technique and conditions employed to produce it, and the properties of the basic nickel carbonate, in turn, influence the properties of the nickel powder precipitated in the reduction step. Thus, in carrying out the method of this invention to produce nickel powder of certain predetermined properties, it is necessary to have regard to the manner in which the reduction feed slurry is prepared.

However, for all feed slurries prepared by a given method, there is a specific relationship between the carbon dioxide and ammonia concentrations in the system and the apparent density of the nickel powder which is precipitated in the reduction step.

Figure 1:
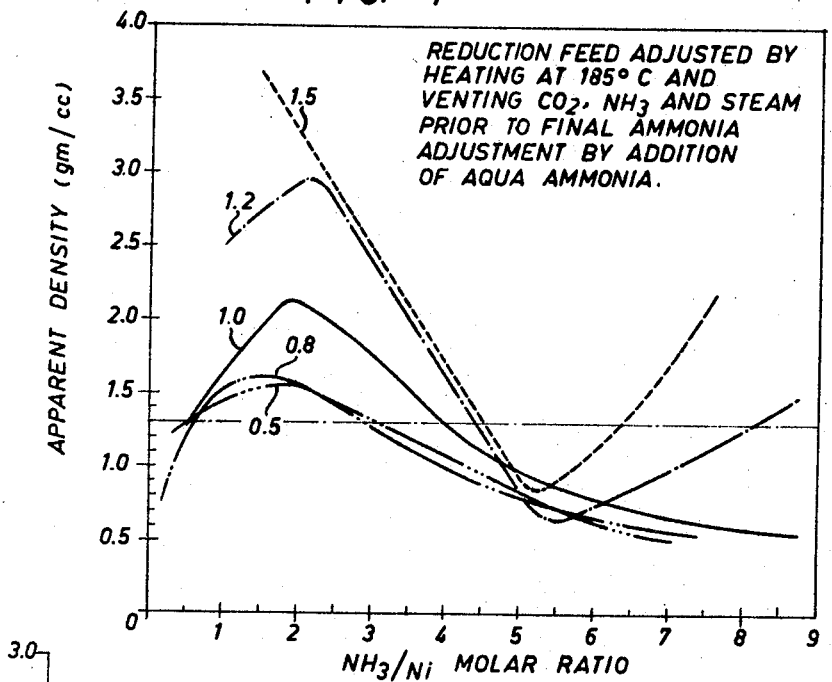
FIGURE 1 is a graph depicting, in accordance with the present invention, the inter-relation existing between apparent density and nickel, carbon dioxide and ammonia concentrations for a reduction feed system adjusted by high temperature heating and venting carbon dioxide and ammonia.
Figure 2:
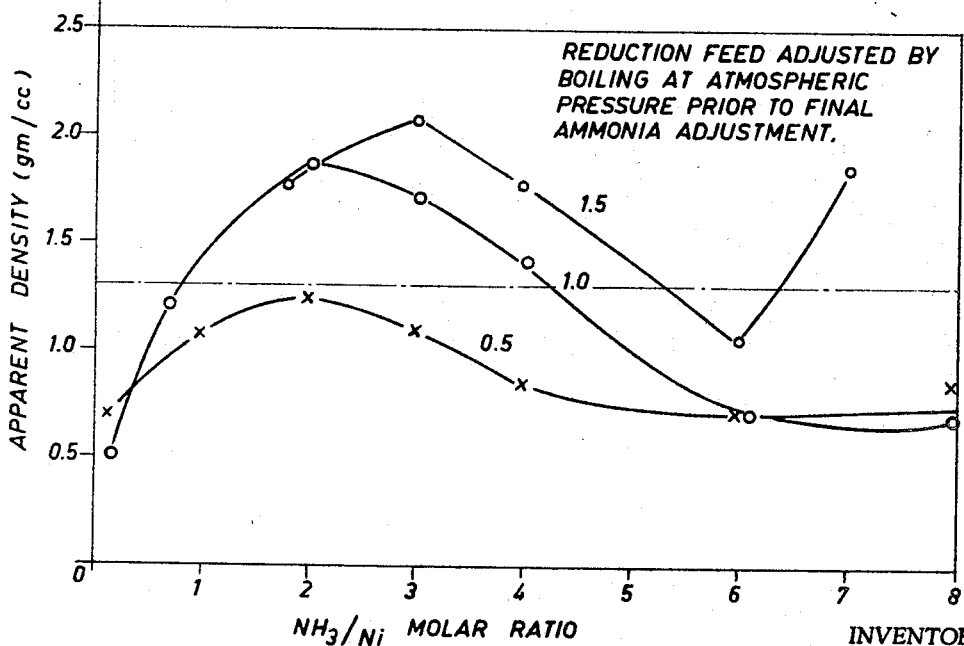
FIGURE 2 is a graph depicting, in accordance with the present invention, the inter-relation existing between apparent density and nickel, carbon dioxide and ammonia concentrations for a reduction feed system adjusted by atmospheric distillation to release carbon dioxide and ammonia.

This is illustrated by the graphs in FIGURES 1 and 2 which depict the relation between ammonia and carbon dioxide concentrations and the apparent density of the nickel powder obtained under optimum reducing conditions for feed slurries prepared by two different techniques.

The basic nickel carbonate in the feed slurry of FIGURE 1 was precipitated by heating a nickel amine carbonate leach solution in an autoclave at 350° F. and venting the $CO_2$, $NH_3$ and steam down to a predetermined system vapour pressure at which the various system compositions would be obtained. That of FIGURE 2 was precipitated by boiling the same type of nickel amine leach solution at atmospheric pressure by direct steam injection during which $CO_2$ and $NH_3$ were released from the system.

It can be observed from FIGURES 1 and 2 that for each of these systems there are two regions of $NH_3/Ni$ molar ratios in which nickel powder of low apparent density, i.e. less than about 1.3 gm./cm.$^3$, can be produced and an intermediate region in which powders of high apparent density, i.e. above 1.3 gm./cc. are produced.

Referring first to FIGURE 1, it can be observed that the first "low density region" is that in which the ammonia to nickel molar ratios are below about 0.7 and the carbon dioxide to nickel molar ratios below about 1.0. The second is that where the molar ratio of $NH_3/Ni$ is at least above 3.0 and the $CO_2/Ni$ molar ratio is at least below 1.5. It can be noted, however, that low density powders are not obtained at any arbitrarily selected $NH_3/Ni$ and $CO_2/Ni$ molar ratios within this broad range but that the ratios must be properly correlated to fall within the region shown on the graph in which the low density powder is obtained. On the other hand, within the narrower range of $NH_3/Ni$ molar ratios between 4.5 and 6.5, low density powder is obtained at any $CO_2/Ni$ molar ratios between 0.4 and 1.5. With proper correlation, high density powders are obtained in the broad range of $NH_3/Ni$ molar ratios of about 0.7 to about 4.5 with $CO_2/Ni$ molar ratios of about 0.5 to about 1.5. High density powders are always obtained at $CO_2/Ni$ molar ratios of about 0.5 to about 1.5 and $NH_3/Ni$ molar ratios in the more narrow range of about 0.7 to about 3.0.

In the system of FIGURE 2, it can be observed that the region of low density powders extends over the whole range of $NH_3Ni$ molar ratios for $CO_2/Ni$ molar ratios below about 0.5. At $CO_2/Ni$ molar ratios in the range of 0.5 to 1.5, low density powders are produced only when the $NH_3/Ni$ molar ratio is below about 1.0 or in the second region when the $NH_3/Ni$ molar ratio is above about 4.0. High density powders are obtained only at $CO_2/Ni$ molar ratios between about 0.5 and 1.5 and $NH_3/Ni$ molar ratios in the range of about 1.0 to 5.0. However, with this system, also, when considering the above noted broad ranges of system composition, it is necessary to properly correlate the $NH_3/Ni$ and $CO_2/Ni$ molar ratios as shown on the graph to ensure that powder of the selected apparent density is obtained. In the narrow range of $NH_3/Ni$ molar ratios of about 5.4 to 6.4, low density powder will be obtained at all $CO_2/Ni$ molar ratios between 0.4 and 1.5.

Thus, on the basis of the relationship between the ammonia, carbon dioxide and apparent density illustrated in FIGURES 1 and 2, the present invention permits the production of two series of nickel powder: those powders having an apparent density below about 1.3 gm./cm.$^3$ and classified generally in this description as low apparent density powders, and those having an apparent density above about 1.3 gm./cm.$^3$ or "high" apparent density powders.

Each of these series is useful for certain specific applications; however, the low apparent density powders have been found particularly suitable for the fabrication of sintered, porous membranes, and the principal utility of the invention resides in the embodiment by which these powders are produced.

As shown on the flow sheet of FIGURE 3, following the system adjustment operation in which the reduction feed is adjusted, having regard to the inter-relationship of apparent density, $NH_3$ and $CO_2$ concentration depicted in FIGURES 1 and 2, such that powder of the predetermined selected apparent density will be produced, the system is reacted with hydrogen to precipitate nickel powder.

At all system compositions within the broad ranges contemplated by this invention, the reduction feed is in the form of a slurry of basic nickel carbonate and aqueous ammonium carbonate solution, and appropriate handling procedures must be followed to prevent settling of the basic nickel carbonate during transfer operations.

The reducing reaction can be conducted under the broad conditions generally known and described in the prior art and particularly in United States Patent No. 2,734,821. The reduction temperature should be above 100° C. and preferably within the range of from about 125° C. to about 225° C. The total pressure at which the reaction is conducted is determined by the pressure autogenously developed by the temperature plus a partial pressure of reducing gas within the range of from about 100 to about 500 pounds per square inch. At lower pressures, the reaction takes place but proceeds too slowly for practical purposes. At higher temperatures and pressures, the reaction will, of course, proceed at a satisfactory rate but the increased reaction rate obtained does not warrant the increase in capital and operating costs inherent in the use of high pressure equipment.

The reducing reaction is self-nucleating; that is, no seed or catalyst is required to initiate or promote the precipitation reaction; however, seed, in the form of fine nickel powder may be added if desired to increase the reaction rate. The reaction is complete when the consumption of hydrogen ceases, usually from about 15 to about 30 minutes at the preferred operating conditions.

The optimum solution composition and reduction conditions for the production of a given powder will also be dictated, to some extent, by the size and shape of the reduction autoclave and the degree and type of agitation provided; however, those skilled in the art can arrive at the precise optimum conditions for production of any given powder with a few trial reductions, having regard to the general principles discussed herein.

At the completion of the reaction, the precipitated nickel particles and reduction end solution are discharged from the reduction autoclave and the particles separated from the solution such as by filtration or centrifuging. The reduction end solution can be re-cycled to the leach step as shown in the flow sheet or it can be discarded. The nickel powder is washed with water and dried. The final product consists of high purity nickel powder having the following typical properties:

TABLE 1.—PHYSICAL CHARACTERISTICS OF NICKEL POWDER PRODUCED FROM THE NICKEL AMMONIUM CARBONATE SYSTEM

| Physical Properties | Type of Powder | |
| --- | --- | --- |
| | Low Density | High Density |
| Apparent Density, gm./cc. | 0.5 to 1.3 | 1.3 to 3.5. |
| Fisher Number | 1.0 to 10.0 | 2.0 to 10. |
| Sintering Characteristics, 20 min. at 1,650° F.: | | |
| Total porosity, percent | 60 to 90 | 40 to 60. |
| Volume shrinkage, percent | 20 to 70 | 10 to 50. |
| Mean pore size in the range of microns | 7 to 24 | 0.7 to 7.0. |

TABLE 2.—CHEMICAL AND SPECTROGRAPHIC ANALYSES OF NICKEL POWDER PRODUCED FROM THE AMMONIUM CARBONATE SYSTEM.

| Element | Amount, percent | Spectrographic (semi-quantitative) |
|---|---|---|
| Ni | Balance | |
| Co | 0.04 to 0.07 | |
| Cu | 0.002 to 0.008 | |
| FE | 0.008 to 0.010 | |
| S | 0.003 to 0.005 | |
| C | 0.010 to 0.040 | |
| Loss in $H^2$ | 0.4 to 1.0 | |
| Al | | 0.008 |
| Ca | | 0.001 |
| Si | | 0.001 |
| Ag, Cd, Cr, Hg, Mg, Mn | | 0.001 |
| As, B, Ba, Be, Bi, Ge, Li, Pb, Mo, Sb, Sn, Te, Ti, V, Zn, Zr. | | (1) |

[1] Not detected.

Figure 4:
FIGURE 4 is a reproduction of a photo-micro graph of a random sample of low density powder particles produced in accordance with a preferred embodiment of the present invention.

The novel characteristics of the particles comprising the low density powders produced in accordance with this invention are shown in FIGURE 4. Particles 10 are formed of clusters of rounded sub-particles 11 adhered together. White dots 12 on the micrograph result from light reflections from rounded surfaces of projecting sub-particles 11. Particles 10 are normally up to about 150 microns in size and sub-particles 11 about 5 microns and smaller. It is believed that the rounded shape of the sub-particles 11 making up the larger particles 10 is an important contributing factor to the low shrinkage characteristics of these powders upon sintering.

The high density powders have the same general shape and appearance as the low density powders but are more evenly sized and have less porosity within the separate particles.

The following example illustrates the operation of the overall process described herein in the production of low density nickel powder: an ammoniacal nickel ammonium carbonate solution was prepared by leaching commercial grade, pure nickel powder under oxidizing conditions in an ammoniacal ammonium carbonate solution at 60° C. The leach end solution, after partial evaporation by steam injection to precipitate basic nickel carbonates and to adjust the carbon dioxide content, contained 172 grams per litre of nickel (in solution and as solid basic nickel carbonates), 124 grams per litre of carbon dioxide and 136 grams per litre of ammonia. (Carbon dioxide to nickel molar ratio=1.0; ammonia to nickel molar ratio=2.8.) This slurry was diluted 1:1 with water and the ammonia to nickel molar ratio adjusted to 6.6:1 with the addition of aqua ammonia solution containing 240 grams per litre of ammonia. The adjusted slurry contained 57.0 grams per litre of nickel, 42.5 grams per litre of carbon dioxide and 108 grams per litre of ammonia. (Carbon dioxide to nickel molar ratio=1.0; ammonia to nickel molar ratio=6.6.)

The adjusted slurry was charged into a 1 gallon high pressure, agitator equipped autoclave externally heated by gas. The autoclave was sealed and heated to a temperature of 350° F. at which temperature the vapour pressure was 300 pounds per square inch. 350 pounds per square inch of hydrogen was applied over the vapour pressure and maintained until the reduction was complete in 25 minutes. The autoclave was cooled, the precipitated nickel powder was discharged from the autoclave and washed with water. The apparent density of the product was 0.64 gram per cubic centimetre. The physical appearance of the powder is illustrated in FIGURE 4.

Two samples of the product were sintered in round graphite molds 1.75 inches in diameter and 0.075 inch in depth. The sintering was conducted at 980° C. for 20 minutes in a hydrogen atmosphere. The porosity of the sintered plaques was 89.0% and the linear shrinkage during sintering was 0.5%.

It will be understood, of course, that modifications of the preferred embodiment of the invention described herein can be made without departing from the scope of the invention defined by the appended claims.

What we claim as new and desire to protect by Letters Patent of the United States is:

1. In chemical precipitation of elemental nickel powder from aqueous media in which nickel is present as a compound by reaction with a non-sulphidizing reducing gas at elevated temperature and pressure, the method of producing high purity nickel powder and controlling the apparent density thereof at a predetermined value within the range of about 0.4 to 3.5 grams per cubic centimetre which comprises: adjusting a reduction feed system comprised of a slurry of nickel carbonates in aqueous ammonium carbonate solution to contain up to 150 g.p.l. of nickel, up to 1.5 moles of carbon dioxide per mole of nickel and up to 8.0 moles of ammonia per mole of nickel; adjusting and correlating the carbon dioxide to nickel and ammonia to nickel molar ratios of said system such that under reduction conditions nickel powder of said predetermined apparent density will be obtained; reacting the so adjusted system with hydrogen at a temperature above about 100° C. and under a partial pressure of hydrogen above about 100 p.s.i.; continuing said reaction with hydrogen to precipitate elemental nickel particles from said system and separating said particles from the reduction end solution.

2. In chemical precipitation of elemental nickel powder from aqueous media in which nickel is present as a salt by reaction with a non-sulphidizing reducing gas at elevated temperature and pressure, the method of producing high purity nickel powder and controlling the apparent density thereof at a predetermined value within the range of about 0.4 to 3.5 grams per cubic centimetre which comprises: adjusting a reduction feed system comprised of a slurry of basic nickel carbonate in aqueous ammonium carbonate solution to contain from about 40 to about 80 g.p.l. of nickel, from about 0.4 to about 1.5 moles of carbon dioxide per mole of nickel and from about 0.05 to about 8.0 moles of ammonia per mole of nickel; adjusting and correlating the carbon dioxide to nickel and ammonia to nickel molar ratios of said system such that under reduction conditions nickel powder of said predetermined apparent density will be obtained; reacting the so adjusted system with hydrogen at a temperature within the range of from about 100° C. to about 350° C. and under a partial pressure of hydrogen above about 350 p.s.i.; continuing said reaction with hydrogen to precipitate elemental nickel particles from said systems and separating said particles from the reduction end solution.

3. In chemical precipitation of elemental nickel powder from aqueous media in which nickel is present as a compound by reaction with a non-sulphidizing reducing gas at elevated temperature and pressure, the method of producing high purity nickel powder and controlling the apparent density thereof at a predetermined value within the range of about 0.4 to 1.3 grams per cubic centimetre which comprises: adjusting a reduction feed system comprised of a slurry of basic nickel carbonate in aqueous ammonium carbonate solution to contain up to 80 g.p.l. of nickel, from about 0.4 to about 1.5 moles of carbon dioxide per mole of nickel and from about 0.05 to about 8.0 moles of ammonia per mole of nickel; adjusting the carbon dioxide to nickel molar ratio to within the range of about 0.4 to about 1.0 and the ammonia to nickel molar ratio to within the range of about 0.05 to about 0.7 whereby under reduction conditions nickel powder having an apparent density of about 0.4 to 1.3 will be precipitated; reacting the so adjusted system with hydrogen at a temperature within the range of from about 125° C. to about 320° C. and under a partial pressure of hydrogen about about 300 p.s.i.; continuing said reaction with hydrogen to precipitate elemental nickel particles from said system and separating said particles from the reduction end solution.

4. In chemical precipitation of elemental nickel powder from aqueous media in which nickel is present as a compound by reaction with a non-sulphidizing reducing gas at elevated temperature and pressure, the method of producing high purity nickel powder and controlling the apparent density thereof at a predetermined value within the range of about 0.4 to 1.3 grams per cubic centimetre which comprises: adjusting a reduction feed system comprised of a slurry of basic nickel carbonate in aqueous ammonium carbonate solution to contain up to 80 g.p.l. of nickel, from about 0.4 to about 1.5 moles of carbon dioxide per mole of nickel and from about 0.05 to about 8.0 g.p.l. ammonia per mole of nickel; adjusting the carbon dioxide to nickel molar ratio to within the range of about 0.4 to about 1.0 and the ammonia to nickel molar ratio to within the range of about 4.0 to 8.0 whereby under reduction conditions nickel powder having an apparent density of about 0.4 to 1.3 will be precipitated; reacting the so adjusted system with hydrogen at a temperature within the range of from about 125° C. to about 320° C. and under a partial pressure of hydrogen above about 300 p.s.i.; continuing said reaction with hydrogen to precipitate elemental nickel particles from said system and and separating said particles from the reduction end solution.

5. In chemical precipitation of elemental nickel powder from aqueous media in which nickel is present as a compound by reaction with a non-sulphidizing reducing gas at elevated temperature and pressure, the method of producing high purity nickel powder and controlling the apparent density thereof at a predetermined value within the range of about 0.4 to 1.3 grams per cubic centimetre which comprises: adjusting a reduction feed system comprised of a slurry of basic nickel carbonate in aqueous ammonium carbonate solution to contain up to 80 g.p.l. of nickel, from about 0.4 to about 1.5 moles of carbon dioxide per mole of nickel and from about 0.05 to about 8.0 g.p.l. ammonia per mole of nickel; adjusting the carbon dioxide to nickel molar ratio to within the range of about 0.4 to about 1.5 and the ammonia to nickel molar ratio to within the range of about 4.5 to 6.5 whereby under reduction conditions nickel powder having an apparent density of about 0.4 to 1.3 will be precipitated; reacting the so adjusted system with hydrogen at a temperature within the range of from about 125° C. to about 320° C. and under a partial pressure of hydrogen above about 300 p.s.i.; continuing said reaction with hydrogen to precipitate elemental nickel particles from said system and separating said particles from the reduction end solution.

6. In chemical precipitation of elemental nickel powder from aqueous media in which nickel is present as a compound by reaction with a non-sulphidizing reducing gas at elevated temperature and pressure, the method of producing high purity nickel powder and controlling the apparent density thereof at a predetermined value within the range of about 1.3 to 3.5 grams per cubic centimetre which comprises: adjusting a reduction feed system comprised of a slurry of basic nickel carbonate in aqueous ammonium carbonate solution to contain up to 80 g.p.l. of nickel, from about 0.4 to about 1.5 moles of carbon dioxide per mole of nickel and from about 0.2 to about 8.0 moles of ammonia per mole of nickel; adjusting the carbon dioxide to nickel molar ratio to within the range of about 1.0 to about 1.5 and the ammonia to nickel molar ratio to within the range of about 1.0 to about 4.0 whereby under reduction conditions nickel powder having an apparent density of about 1.3 to 3.5 will be precipitated; reacting the so adjusted system with hydrogen at a temperature within the range of from about 125° C. to about 320° C. and under a partial pressure of hydrogen above about 300 p.s.i.; continuing said reaction with hydrogen to precipitate elemental nickel particles from said system and separating said particles from the reduction end solution.

7. A method for producing nickel powder having a predetermined apparent density below about 1.3 grams per cubic centimetre by gaseous reduction of nickel from aqueous media which comprises the steps of: providing an aqueous ammoniacal nickel ammonium carbonate solution containing up to 180 grams per litre of nickel; heating said solution at atmospheric pressure to precipitate substantially all the nickel therefrom as basic nickel carbonates whereby a slurry of ammonium carbonate solution and basic nickel carbonates is obtained; adjusting the composition of said slurry such that the carbon dioxide to nickel molar ratio is about 0.4 to 0.6 and the ammonia to nickel molar ratio is in the range of about 0.05 to 8.0; reacting the so adjusted slurry with hydrogen at a temperature of about 125° C. to 320° C. and under a partial pressure of hydrogen above about 300 p.s.i.; continuing said reducing reaction to precipitate elemental nickel particles from said slurry and separating said particles from the reduction end solution.

8. The method according to claim 7 wherein the aqueous ammoniacal nickel ammonium carbonate solution is obtained by leaching nickel powder with ammoniacal ammonium carbonate solution in the presence of oxygen.

9. The method according to claim 7 in which the heating step is conducted by direct injection of steam into the solution.

10. A method for producing nickel powder having a predetermined apparent density below about 1.3 grams per cubic centimetre by gaseous reduction of nickel from aqueous media which comprises the steps of: providing an aqueous ammoniacal nickel ammonium carbonate solution containing up to 180 grams per litre of nickel; heating said solution at atmospheric pressure to release carbon dioxide, ammonia and steam and precipitate substantially all the nickel therefrom as basic nickel carbonates whereby a slurry of ammonium carbonate solution and basic nickel carbonates is obtained; adjusting the composition of said slurry such that the carbon dioxide to nickel molar ratio is about 0.4 to 1.0 and the ammonia to nickel molar ratio is in the range of about 0.05 to 0.8; reacting the so adjusted slurry with hydrogen at a temperature of about 125° C. to 320° C. and under a partial pressure of hydrogen above about 300 p.s.i.; continuing said reducing reaction to precipitate elemental nickel particles from said slurry and separating said particles from the reduction and solution.

11. A method for producing nickel powder having a predetermined apparent density between about 1.3 and 3.5 grams per cubic centimetre by gaseous reduction of nickel from aqueous media which comprises the steps of: providing an aqueous ammoniacal nickel ammonium carbonate solution containing up to 180 grams per litre of nickel; heating said solution at atmospheric pressure to release carbon dioxide, ammonia and steam and precipitate substantially all the nickel therefrom as basic nickel carbonates whereby a slurry of ammonium carbonate solution and basic nickel carbonates is obtained; adjusting the composition of said slurry such that the carbon dioxide to nickel molar ratio is about 1.0 to 1.5 and the ammonia to nickel molar ratio is in the range of about 1.0 to 4.0; reacting the so adjusted slurry with hydrogen at a temperature of about 125° C. to 320° C. and under a partial pressure of hydrogen above about 300 p.s.i.; continuing said reducing reaction to precipitate elemental nickel particles from said slurry and separating said particles from the reduction end solution.

12. A method for producing nickel powder having a predetermined apparent density below about 1.3 grams per cubic centimetre by gaseous reduction of nickel from aqueous media which comprises the steps of: providing an aqueous ammoniacal nickel ammonium carbonate solution containing up to 180 grams per litre of nickel; heating said solution in a sealed pressure vessel at a temperature of about 185° C. and venting carbon dioxide, ammonia and steam to precipitate substantially all the nickel therefrom as basic nickel carbonates whereby a slurry of ammonium carbonate solution and basic nickel carbonates is obtained; adjusting the composition of said slurry such that the carbon dioxide to nickel molar ratio is about 0.4 to 1.0 and the ammonia to nickel molar ratio is in the range of about 0.05 to 0.7; reacting the so adjusted slurry with hydrogen at a temperature of about 125° C. to 320° C. and under a partial pressure of hydrogen above about 300 p.s.i.; continuing said reducing reaction to precipitate elemental nickel particles from said slurry and separating said particles from the reduction end solution.

13. A method for producing nickel powder having a predetermined apparent density below about 1.3 grams per cubic centimetre by gaseous reduction of nickel from aqueous media which comprises the steps of: providing an aqueous ammoniacal nickel ammonium carbonate solution containing up to 180 grams per litre of nickel; heating said solution in a sealed pressure vessel at a temperature of about 185° C. and venting carbon dioxide, ammonia and steam to precipitate substantially all the nickel therefrom as basic nickel carbonates whereby a slurry of ammonium carbonate solution and basic nickel carbonates is obtained; adjusting the composition of said slurry such that the carbon dioxide to nickel molar ratio is about 0.4 to 1.0 and the ammonia to nickel molar ratio is in the range of about 4.0 to 8.0; reacting the so adjusted slurry with hydrogen at a temperture of about 125° C. to 320° C. and under a partial pressure of hydrogen about 3.0 p.s.i.; continuing said reducing reaction to precipitate elemental nickel particles from said slurry and separating said particles from the reduction end solution.

14. A method for producing nickel powder having a predetermined apparent density below about 1.3 grams per cubic centimetre by gaseous reduction of nickel from aqueous media which comprises the steps of providing an aqueous ammoniacal nickel ammonium carbonate solution containing up to 180 grams per litre of nickel; heating said solution in a sealed pressure vessel at a temperature of about 185° C. and venting carbon dioxide, ammonia and steam to precipitate substantially all the nickel therefrom as basic nickel carbonates whereby a slurry of ammonium carbonate solution and basic nickel carbonates is obtained; adjusting the composition of said slurry such that the carbon dioxide to nickel molar ratio is about 0.4 to 1.5 and the ammonia to nickel molar ratio is in the range of about 4.5 to 6.5; reacting the so adjusted slurry with hydrogen at a temperature of about 125° C. to 320° C. and under a partial pressure of hydrogen above 300 p.s.i.; continuing said reducing reaction to precipitate elemental nickel particles from said slurry and separating said particles from the reduction end solution.

15. A method for producing nickel powder having a predetermined apparent density between about 1.3 and 3.5 grams per cubic centimetre by gaseous reduction of nickel from aqueous media which comprises the steps of: providing an aqueous ammoniacal nickel ammonium carbonate solution containing up to 180 grams per litre of nickel; heating said solution in a sealed pressure vessel at a temperature of about 185° C. and venting carbon dioxide, ammonia and steam to precipitate substantially all the nickel therefrom as basic nickel carbonates whereby a slurry of ammonium carbonate solution and basic nickel carbonates is obtained; adjusting the composition of said slurry such that the carbon dioxide to nickel molar ratio is about 0.4 to 1.5 and the ammonia to nickel molar ratio is in the range of about 0.7 to 3.0; reacting the so adjusted slurry with hydrogen at a temperature of about 125° C. to 320° C. and under a partial pressure of hydrogen above about 300 p.s.i.; continuing said reducing reaction to precipitate elemental nickel particles from said slurry and separating said particles from the reduction end solution.

16. A nickel powder obtained by hydrogen reduction from an aqueous nickel ammonium carbonate system and having an apparent density below 1.3 grams per cubic centimetre, said powder being comprised of grape-like clusters of rounded nickel particles of a size below about 5 microns adhered together, said clusters being up to about 150 microns in size.

17. A nickel powder according to claim 16 having a specific surface area between 0.5 and about 1.1 m.$^2$/gm. and a Fisher number of about 2.0 to 5.0.

18. The method according to claim 12 wherein the aqueous ammoniacal nickel ammonium carbonate solution is obtained by leaching nickel bearing scrap material or the like in ammoniacal ammonium carbonate solution in the presence of oxygen and subjecting the so obtained leach solution to purification steps to provide a nickel bearing solution substantially free of contaminants.

19. The method according to claim 12 wherein the aqueous ammoniacal nickel carbonate solution is obtained by dissolving nickel carbonate in ammoniacal ammonium carbonate solution.

References Cited
UNITED STATES PATENTS

| | | | |
|---|---|---|---|
| 2,734,821 | 2/1956 | Schaufelberger | 75—.55 |
| 2,853,374 | 9/1958 | Schaufelberger | 75—.55 |

HYLAND BIZOT, *Primary Examiner*

W. W. STALLARD, *Assistant Examiner.*